June 3, 1941.    H. J. ABLAH    2,244,039
BREAD TOASTER
Filed June 12, 1940    3 Sheets-Sheet 1

Inventor
Harvey J. Ablah,

By Clarence A. O'Brien

Attorneys

June 3, 1941.　　　H. J. ABLAH　　　2,244,039
BREAD TOASTER
Filed June 12, 1940　　　3 Sheets-Sheet 2

Inventor
Harvey J. Ablah.

By Clarence A. O'Brien

Attorneys

June 3, 1941.  H. J. ABLAH  2,244,039
BREAD TOASTER
Filed June 12, 1940  3 Sheets-Sheet 3

Inventor
Harvey J. Ablah.

By *Clarence A. O'Brien*

Attorneys

Patented June 3, 1941

2,244,039

UNITED STATES PATENT OFFICE 2,244,039

BREAD TOASTER

Harvey J. Ablah, Wichita, Kans.

Application June 12, 1940, Serial No. 340,182

6 Claims. (Cl. 53—5)

The present invention relates to new and useful improvements in bread toasters and has for its primary object to provide a tiltable shelf adapted to normally support the bread in position for exposure to a heating element to toast the same, together with automatic means for tilting the shelf after a predetermined lapse of time to discharge the toasted bread therefrom.

A further object is to provide an automatic bread toaster of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1:
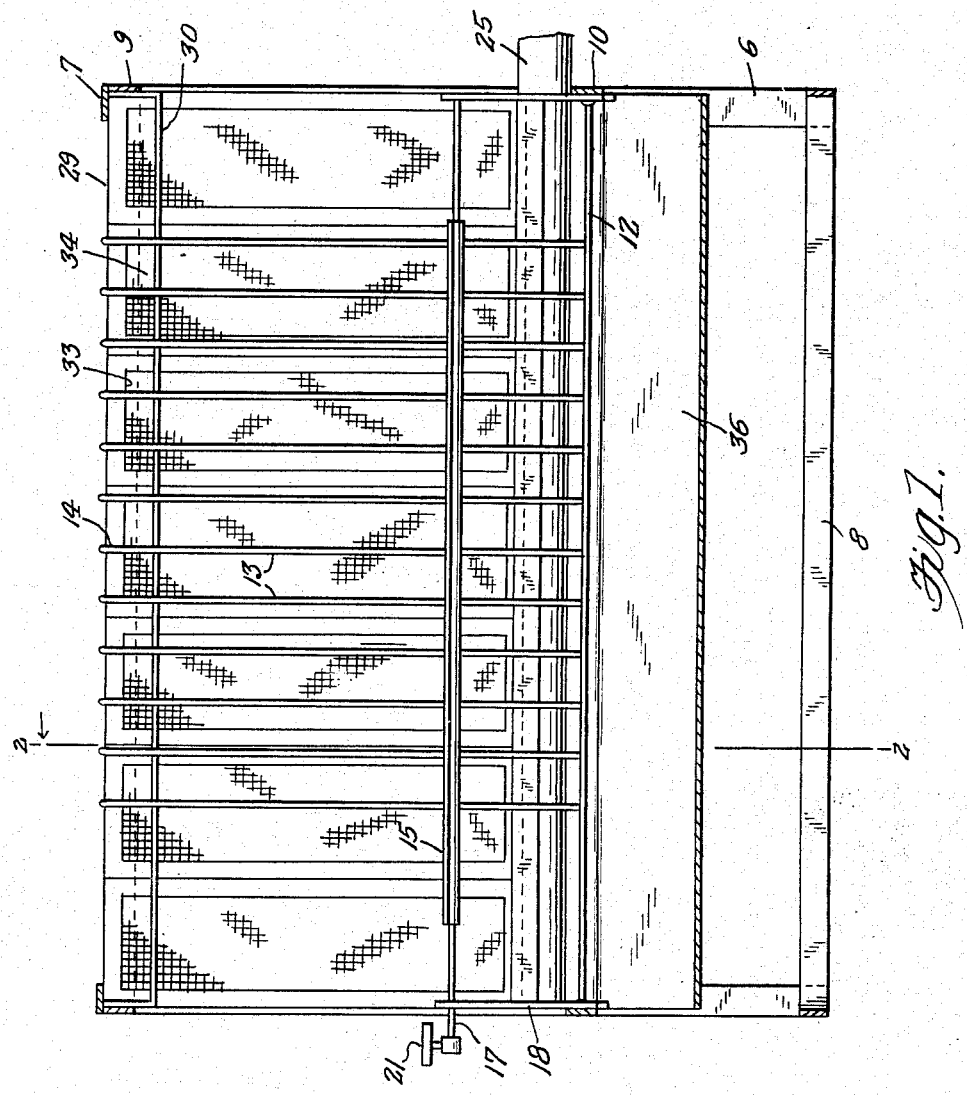
Figure 1 is a longitudinal vertical sectional view through the toaster.
Figure 5:
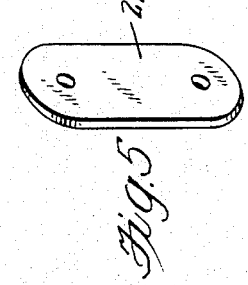
Figure 5 is a similar view of one of the gas pipe supporting plates.

Referring now to the drawings in detail, wherein for the purpose of illustration I have disclosed a preferred embodiment of the invention, the numeral 5 designates the toasting frame generally which is of open, box-like form and including upright corner members 6 connected at their upper ends by a cross frame member 7 and also including a bottom horizontally disposed rectangular frame member 8, top horizontally disposed rectangular frame member 9, and an intermediate horizontally disposed rectangular frame member 10, all of said frame members being secured to each other in any suitable manner, as by welding, soldering or the like.

A pair of spaced parallel longitudinally extending bars 11 have their end portions connected to the opposite ends of the upper frame member 9 and a pair of longitudinally extending spaced parallel bars 12 also having their end portions secured to the opposite ends of the intermediate frame member 10. A plurality of toast guide rods 13 have hooks 14 formed at their upper ends for engaging over the bars 11, the lower ends of said rods being supported on the lower longitudinal bars 12, as more clearly shown in Figure 2 of the drawings. The lower ends of the rods 13 are offset oppositely in a direction toward the adjacent side edges of the frame 5 to space said rods further apart at their lower ends and between said widely spaced ends of the rods 13 is positioned a shelf 15 and arranged horizontally beneath the channel 16 formed between the upper portion of the spaced bars 13, the shelf having one longitudinal edge secured to a rock shaft 17 having its ends journalled in upright supports 18 extending upwardly from the intermediate frame member 10 and secured thereto by rivets 19 or the like.

To one end of the shaft 17 is secured a lever 20 having an enlarged weighted head 21 formed at its outer end, the lever projecting from the shaft 17 diametrically opposite from the shelf 15 and the weight of the lever being adapted to normally maintain the shelf in a horizontal position.

Secured to an intermediate portion of the lever is a chain or flexible member 22 having its opposite end extending upwardly and into a housing 23 secured at one end of the frame 5 and in which is mounted an automatic time actuated mechanism of conventional construction, such as a type disclosed in Patent No. 1,500,958, the timing mechanism being adapted to exert an upward pull on the chain 22 after a predetermined lapse of time for raising the lever 20. The timing mechanism also includes an adjusting handle 24.

Extending longitudinally of the toaster frame 5 is a pair of gas pipes 25 having burner orifices 26 formed therein, the ends of the pipes being secured on plates 27 attached to the opposite end portions of the intermediate frame member 10 by means of rivets 28 or the like.

Arranged within the frame 5 is a plurality of box-like heat reflectors 29 secured in upright position by an upper bracket 30 and a lower bracket 31, the bottom of each of the reflectors having an opening 32 formed therein with which the orifices 26 communicate, the reflectors being arranged in an upright row at each side of the shelf 15 and provided at their inner faces with an opening 33 covered with a screen 34. Positioned against the outer walls of each of the reflectors 29 is a heat insulation lining 35, the insulation being held in position by the corner frame members 6.

Extending longitudinally of the frame beneath the shelf 15 is a chute 36 inclined downwardly toward one longitudinal side of the frame and adapted to receive the toast from the shelf 15 for discharging the same from the toaster.

In the operation of the device the gas pipes 25 are connected to a suitable source of supply and constitute burners for supplying heat to the reflectors 29, the heat being discharged from the opposed faces of the reflectors in a direction toward the toast placed upon the shelf 15 through the upper end of the channel 16.

Figure 2:
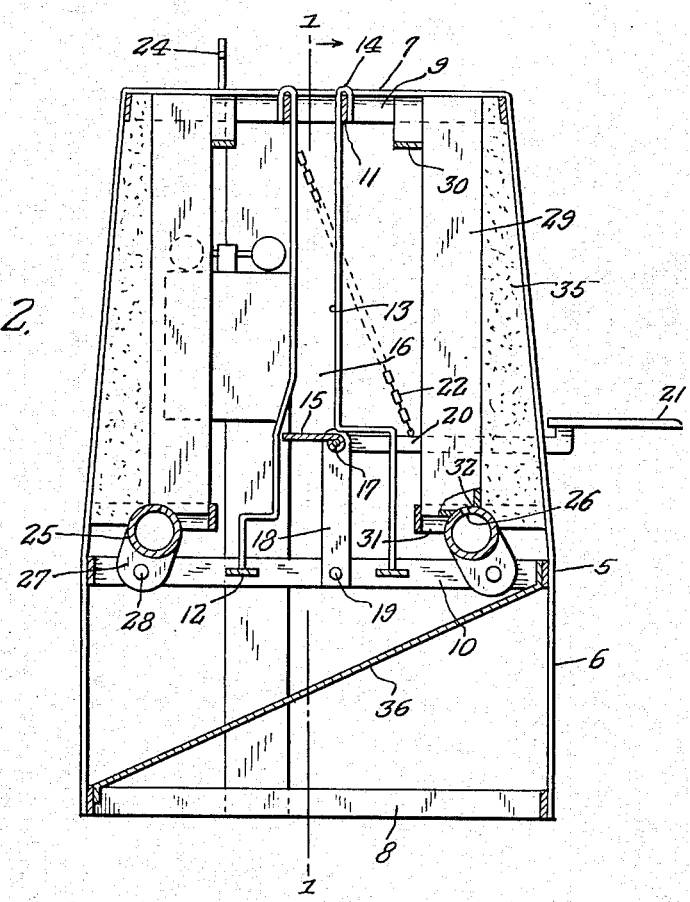
Figure 2 is a transverse vertical sectional view taken substantially on a line 2—2 of Figure 1.
Figure 3:
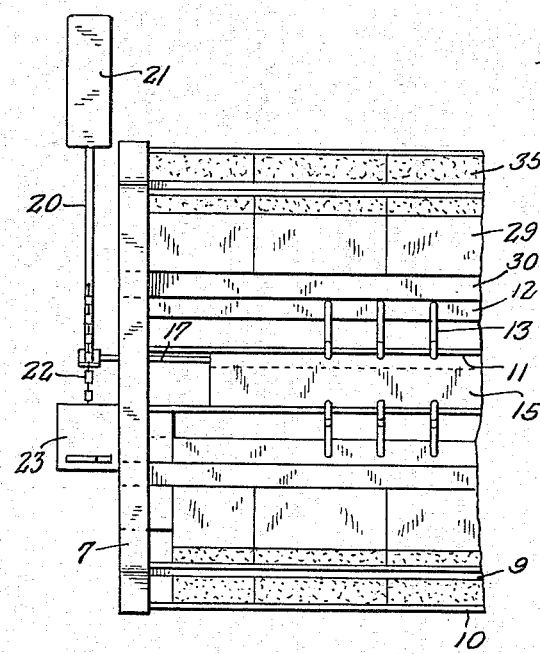
Figure 3 is a fragmentary top plan view of one end of the toaster.
Figure 4:
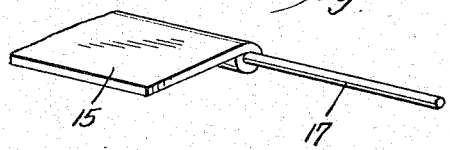
Figure 4 is a fragmentary perspective view of the bread-supporting shelf.

The automatic time mechanism is set by the movement of the lever 20 downwardly into the position as shown in Figure 2 of the drawings, said mechanism operating to pull the chain 22 upwardly after a predetermined lapse of time to tilt the shelf 15 downwardly and discharge the toast upon the chute 36.

Figure 6:
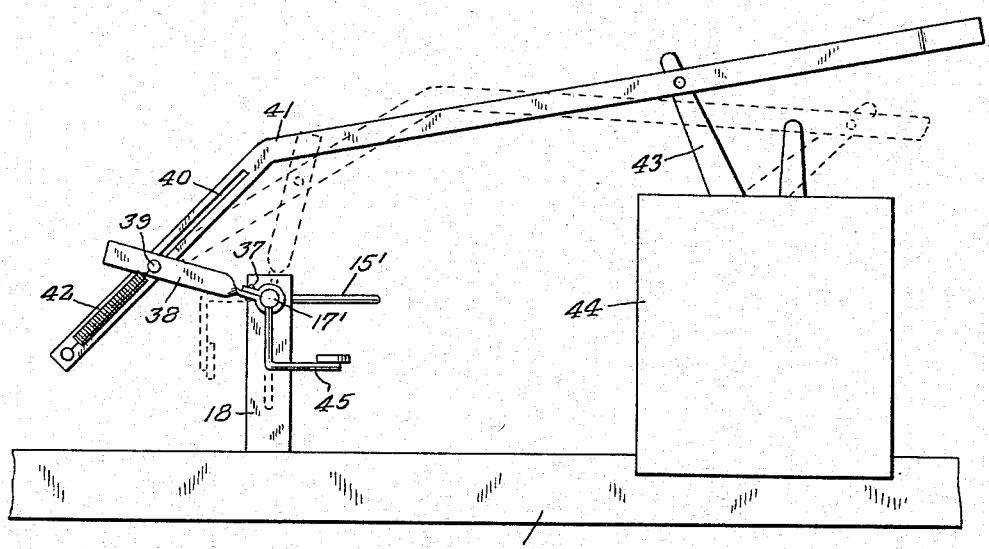
Figure 7:
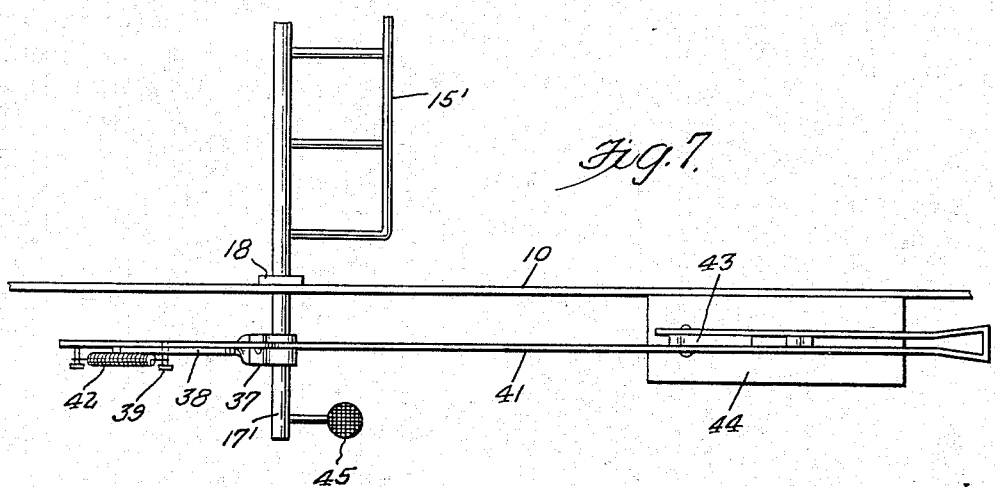

In Figures 6 and 7 of the drawings I have illustrated a modified control mechanism for tilting the shelf, said shelf being indicated at 15', of reticulated form suitably secured to the shaft 17'. One end of the shaft projects outwardly from the frame of the toaster, as shown in Figure 7, and is provided with a split clamping collar 37 from which an arm 38 projects radially from the shaft, the outer end of the arm having a pin 39 slidably mounted in a slotted opening 40 extending longitudinally adjacent one end of a link 41. The pin is normally maintained in one end of the opening by a coil spring 42 which is attached at one end to the link and is attached at its other end to said pin.

The link is of angular form and has its other end pivotally attached to a switch lever 43 of a time-controlled mechanism designated generally at 44 of conventional clock-works construction adapted to swing the lever from the full line position shown in Figure 6 to the dotted line position after a predetermined lapse of time whereby the shelf 15' will be tilted downward to discharge the toast.

Manual operating means are also provided which consists of a hand lever 45 projecting laterally from the shaft and adapted to rock the latter, the pin and slot connection 39 and 40 permitting movement of the shaft and arm 38 independently of the link 41.

While I have disclosed the invention equipped with gas burners as the necessary heat agent, it will be understood that other forms of heating devices may be employed, such as electric heating elements in place of said gas burners.

It is believed the details of construction, operation and manner of use of the device will be readily understood from the foregoing without further detailed explanation.

Having thus described the invention, what I claim is:

1. A bread toaster comprising a casing having spaced upstanding bread receiving guides secured therein, a shelf positioned between said guides for supporting the bread thereon, a weighted lever normally maintaining the shelf in a horizontal position, time controlled means operatively attached to said lever to raise the latter for tilting said shelf, and heaters positioned at opposite sides of the shelf.

2. A bread toaster comprising a casing having spaced upstanding bread receiving guides secured therein, a shelf positioned between said guides for supporting the bread thereon, a weighted lever normally maintaining the shelf in a horizontal position, time controlled means operatively attached to said lever to raise the latter for tilting said shelf, and heaters positioned at opposite sides of the shelf, said heaters including a plurality of upright box-like reflectors having open opposed sides and heating elements communicating with the bottom of said reflectors.

3. A bread toaster comprising a casing having spaced upstanding bread receiving guides secured therein, a shelf positioned between said guides for supporting the bread thereon, a weighted lever normally maintaining the shelf in a horizontal position, time controlled means operatively attached to said lever to raise the latter for tilting said shelf, and heaters positioned at opposite sides of the shelf, said heaters including a plurality of upright box-like reflectors having open opposed sides and gas burners positioned beneath said reflectors and having burner orifices communicating with the interior thereof.

4. A bread toaster comprising a casing in the form of an open frame and including upstanding corner frame members, cross frame members connecting the upper ends of said corner frame members, upper and lower horizontally disposed rectangular frame members connecting said corner frame members, an intermediate horizontally disposed rectangular-shaped frame member connecting said corner frame members, upper and lower pairs of spaced parallel longitudinally extending bars having their ends connected respectively, to the upper and intermediate frame members, a plurality of guide rods arranged in upstanding spaced relation with their ends secured to said upper and lower bars to provide a channel for receiving the bread through the upper end of the casing, a rock shaft, means for rotatably supporting the rock shaft on said intermediate frame member, a shelf having one edge portion secured to said rock shaft and positioned at the bottom portion of said bread guide channel, a lever having one end secured to said shaft and projecting therefrom opposite to the shelf, a weighted handle on said lever adapted to normally maintain the shelf in a horizontal position, a pair of heating elements positioned at opposite sides of the shelf, a chute positioned beneath the shelf and time controlled means operatively connected to said lever for tilting said shelf to deposit the bread upon said chute.

5. In a bread toaster, a bread supporting shelf, a rock shaft normally supporting the shelf in a horizontal position adjacent a heating element, time-controlled means operatively connected to the shaft for rocking the latter in a manner to tilt the shelf downwardly and manually operable means also attached to the shaft for similarly rocking the same independently of the time-controlled means.

6. In a bread toaster, a bread supporting shelf, a rock shaft normally supporting the shelf in a horizontal position adjacent a heating element, an arm projecting radially from the shaft, a time-controlled mechanism including a lever, a link having one end pivotally attached to the lever, a pin and slot connection between the outer end of the arm and the other end of said link, spring means yieldably urging the pin in one end of the slot for actuating the shaft upon a predetermined movement of the lever and a manually operable lever attached to the shaft for actuating the latter independently of said first named lever.

HARVEY J. ABLAH.